(12) United States Patent
Takeda et al.

(10) Patent No.: US 9,439,182 B2
(45) Date of Patent: Sep. 6, 2016

(54) RADIO COMMUNICATION SYSTEM, RADIO BASE STATION APPARATUS, USER TERMINAL AND RADIO COMMUNICATION METHOD

(71) Applicant: NTT DOCOMO, INC., Tokyo (JP)

(72) Inventors: Kazuaki Takeda, Tokyo (JP); Liu Liu, Beijing (CN); Lan Chen, Beijing (CN); Qin Mu, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 81 days.

(21) Appl. No.: 14/356,312

(22) PCT Filed: Nov. 8, 2012

(86) PCT No.: PCT/JP2012/079022
§ 371 (c)(1),
(2) Date: May 5, 2014

(87) PCT Pub. No.: WO2013/069745
PCT Pub. Date: May 16, 2013

(65) Prior Publication Data
US 2014/0348038 A1    Nov. 27, 2014

(30) Foreign Application Priority Data

Nov. 9, 2011    (JP) .................................. 2011-245865

(51) Int. Cl.
*G01R 31/08* (2006.01)
*H04W 72/04* (2009.01)
(Continued)

(52) U.S. Cl.
CPC .............. *H04W 72/042* (2013.01); *H04L 1/18* (2013.01); *H04L 5/001* (2013.01); *H04L 5/14* (2013.01); *H04W 72/1289* (2013.01); *H04L 5/0053* (2013.01)

(58) Field of Classification Search
CPC   H04W 72/042; H04W 72/1289; H04L 1/18; H04L 5/14; H04L 5/001; H04L 5/0053
See application file for complete search history.

(56) References Cited

U.S. PATENT DOCUMENTS

2012/0327886 A1*  12/2012  Yu et al. ........................ 370/329
2013/0028108 A1*   1/2013  Wu et al. ...................... 370/252
(Continued)

OTHER PUBLICATIONS

International Search Report for corresponding International Application No. PCT/JP2012/079022, mailed Feb. 5, 2013 (1 page).
(Continued)

*Primary Examiner* — Robert Wilson
(74) *Attorney, Agent, or Firm* — Osha Liang LLP

(57) ABSTRACT

The present invention is designed to prevent the decrease of capacity even when the ratio of uplink subframes and downlink subframes is changed in each component carrier in TDD carrier aggregation. With the radio communication method according to the present invention, a radio base station apparatus generates a downlink control channel signal containing downlink control information including carrier indicator field information, and transmits the downlink control channel signal to a user terminal, and the user terminal receives the downlink control channel signal and executes signal processing with respect to the downlink signal in accordance with the downlink control information. In this case, the carrier indicator field information is information which associates a carrier index and the number of subframes to schedule victim subframes.

13 Claims, 15 Drawing Sheets

(51) Int. Cl.
*H04L 1/18* (2006.01)
*H04W 72/12* (2009.01)
*H04L 5/14* (2006.01)
*H04L 5/00* (2006.01)

(56) References Cited

U.S. PATENT DOCUMENTS

2013/0058240 A1* 3/2013 Kim et al. .................. 370/252
2014/0126485 A1* 5/2014 Chen et al. ................. 370/329
2014/0126490 A1* 5/2014 Chen et al. ................. 370/329
2014/0241223 A1* 8/2014 Takeda et al. .............. 370/280
2014/0348038 A1* 11/2014 Takeda et al. .............. 370/280

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

* cited by examiner

| CELL INDEX | NUMBER OF SUBFRAMES | CIF |
|---|---|---|
| X | 1 | 000 |
| | 2 | 001 |
| | 3 | 010 |
| | 4 | 011 |
| | 5 | 100 |
| | 6 | 101 |
| | 7 | 110 |
| | 8 | 111 |

| CELL INDEX | NUMBER OF SUBFRAMES | CIF |
|---|---|---|
| 1 | 1 | 000 |
| | 2 | 001 |
| | 3 | 010 |
| | 4 | 011 |
| 2 | 1 | 100 |
| | 2 | 101 |
| | 3 | 110 |
| | 4 | 111 |

| CELL INDEX | NUMBER OF SUBFRAMES | CIF |
|---|---|---|
| 1 | 1 | 000 |
| | 2 | 001 |
| | 3 | 010 |
| 2 | 1 | 011 |
| | 2 | 100 |
| | 3 | 101 |
| 3 | 1 | 110 |
| | 2 | 111 |

| CELL INDEX | NUMBER OF SUBFRAMES | CIF |
|---|---|---|
| 1 | 1 | 000 |
|   | 2 | 001 |
| 2 | 1 | 010 |
|   | 2 | 011 |
| 3 | 1 | 100 |
|   | 2 | 101 |
| 4 | 1 | 110 |
|   | 2 | 111 |

| CELL INDEX | NUMBER OF SUBFRAMES | CIF |
|---|---|---|
| 1 | 1 | 000 |
| | X | 001 |
| 2 | 1 | 010 |
| | X | 011 |
| 3 | 1 | 100 |
| | X | 101 |
| 4 | X | 110 |
| 5 | X | 111 |

RADIO COMMUNICATION SYSTEM, RADIO BASE STATION APPARATUS, USER TERMINAL AND RADIO COMMUNICATION METHOD

TECHNICAL FIELD

The present invention relates to a radio communication system, a radio base station apparatus, a user terminal and a radio communication method that are applicable to a cellular system and so on.

BACKGROUND ART

In the UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (non-patent literature 1).

In the third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about 75 Mbps on the uplink by using a variable band that ranges from 1.4 MHz to 20 MHz. Furthermore, in the UMTS network, for the purpose of achieving further broadbandization and higher speed, successor systems of LTE have been under study (for example, LTE-Advanced (LTE-A)). The system band of the LTE-A system includes at least one component carrier (cell), where the system band of the LTE system is one unit. Widening the band by way of aggregating a plurality of component carriers in this way is referred to as "carrier aggregation."

In radio communication, as uplink and downlink duplexing methods, there are frequency division duplexing (FDD) to divide the uplink and the downlink by frequency and time division duplexing (TDD) to divide the uplink and the downlink by time. In Release-10 LTE, when carrier aggregation is executed in TDD, as shown in FIG. 1A, the ratio of uplink subframes and downlink subframes (Transmission Time Intervals: TTIs) is the same in all component carriers. In Release-11 LTE, considering application of a heterogeneous network and so on, as shown in FIG. 1B, changing the ratio of uplink subframes and downlink subframes in each component carrier when carrier aggregation is executed in TDD, is under study.

Meanwhile, when broadbandization is achieved by way of increasing the number of component carriers (the number of carrier aggregations) to use for communication between a radio base station apparatus and a user terminal, as shown in FIG. 2, for example, it is possible to multiplex and transmit downlink control information (DCI 2) for the downlink shared channel to be transmitted by a component carrier CC 2 (S-cell (Secondary-cell)) on the downlink control channel (PDCCH) of another component carrier CC 1 (P-cell (Primary-cell)) (cross-carrier scheduling). Here, a DCI configuration, in which a carrier indicator (CI) is added in order to identify which component carrier (CC 1 or CC 2) the information of the downlink control information (DCI 2) relates to, is adopted. The field to represent the carrier indicator (CI) is the CIF. That is to say, when DCI for shared data channel demodulation to be multiplexed on the data field of a given component carrier is multiplexed over the control channel field of another component carrier, a CIF to represent the index of the component carrier (carrier index) where the shared data channel to be demodulated is multiplexed, is added to the DCI.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

As shown in FIG. 1B, when, in TDD carrier aggregation, the ratio of uplink subframes and downlink subframes is changed in each component carrier, a case might occur where, as shown in FIG. 3, the number of downlink subframes in the P-cell becomes smaller than the number of downlink subframes in the S-cell. When cross-carrier scheduling is applied to this case, given that there are relatively few P-cell downlink subframes, subframes that are not scheduled by the PDCCH (Physical Downlink Control Channel) of the P-cell are produced in the S-cell.

For example, in FIG. 3, the fourth and fifth downlink subframes from the left in the S-cell and the eighth uplink subframe from the left in the S-cell are subframes that are not scheduled. The fourth and fifth downlink subframes from the left of the S-cell are not scheduled because the subframes in the P-cell corresponding to these subframes are the uplink, and therefore cross-carrier scheduling is not possible. Also, as for the uplink subframe of the S-cell, its scheduling information is reported in the P-cell subframe that is four subframes earlier. However, the P-cell subframe that is four subframes earlier, which corresponds to the eighth uplink subframe from the left in the S-cell, is the uplink and therefore is not scheduled.

Here, the definitions of the subframes shown in FIG. 3 will be given below. A common subframe ("C-subframe") refers to a downlink or uplink subframe that can be scheduled by the PDCCH in the present subframe or a link subframe. A victim subframe ("V-subframe") refers to a downlink or uplink subframe that cannot be scheduled by the PDCCH in the present subframe or a link subframe. A super subframe ("S-subframe") refers to a subframe that can schedule victim subframes.

When, in this way, S-cell subframes cannot be scheduled, problems of the decrease of capacity arise: (1) the peak data rate decreases, (2) the freedom of scheduling decrease, (3) the scheduling delay increases, (4) multi-user diversity cannot be optimized efficiently and so on.

The present invention has been made in view of the above, and it is therefore an object of the present invention to provide a radio communication system, a radio base station apparatus, a user terminal and a radio communication method, whereby, even when the ratio of uplink subframes and downlink subframes is changed in each component carrier in in TDD carrier aggregation, it is possible to prevent the decrease of capacity.

Solution to Problem

A radio communication system according to the present invention includes a radio base station apparatus and a user terminal that performs radio communication with the radio base station apparatus by time division duplexing, and which achieves broadbandization by carrier aggregation, and, in this radio communication system: the radio base station apparatus has: a generating section that generates a downlink control channel signal containing downlink control information including carrier indicator field information; and a transmission section that transmits the downlink control channel signal to the user terminal; and the user terminal has: a receiving section that receives the downlink control channel signal; and a signal processing section that executes signal processing with respect to a downlink signal in accordance with the downlink control information, and the carrier indicator field information is information that associates a carrier index and the number of subframes to schedule victim subframes.

A radio base station apparatus according to the present invention is a radio base station apparatus in a radio communication system which includes the radio base station apparatus and a user terminal that performs radio communication with the radio base station apparatus by time division duplexing, and which achieves broadbandization by carrier aggregation, and this radio base station apparatus has: a generating section that generates a downlink control channel signal containing downlink control information including carrier indicator field information; and a transmission section that transmits the downlink control channel signal to the user terminal, and the carrier indicator field information is information that associates a carrier index and the number of subframes to schedule victim subframes.

A user terminal according to the present invention is a user terminal in a radio communication system which includes a radio base station apparatus and the user terminal that performs radio communication with the radio base station apparatus by time division duplexing, and which achieves broadbandization by carrier aggregation, and this user terminal has: a receiving section that receives a downlink control channel signal containing downlink control information including carrier indicator field information; and a signal processing section that executes signal processing with respect to a downlink signal in accordance with the downlink control information, and the carrier indicator field information is information that associates a carrier index and the number of subframes to schedule victim subframes.

A radio communication method according to the present invention is a radio communication method in a radio communication system which includes a radio base station apparatus and a user terminal that performs radio communication with the radio base station apparatus by time division duplexing, and which achieves broadbandization by carrier aggregation, and this radio communication method includes the steps of: at the radio base station apparatus: generating a downlink control channel signal containing downlink control information including carrier indicator field information; and transmitting the downlink control channel signal to the user terminal; and at the user terminal: receiving the downlink control channel signal; and executing signal processing with respect to a downlink signal in accordance with the downlink control information, and the carrier indicator field information is information that associates a carrier index and the number of subframes to schedule victim subframes.

Advantageous Effects of Invention

According to the present invention, it is possible to prevent the decrease of capacity even when the ratio of uplink subframes and downlink subframes is changed in each component carrier in TDD carrier aggregation.

DESCRIPTION OF EMBODIMENTS

Now, embodiments of the present invention will be described below in detail with reference to the accompanying drawings.

Figures 1A, 1B:
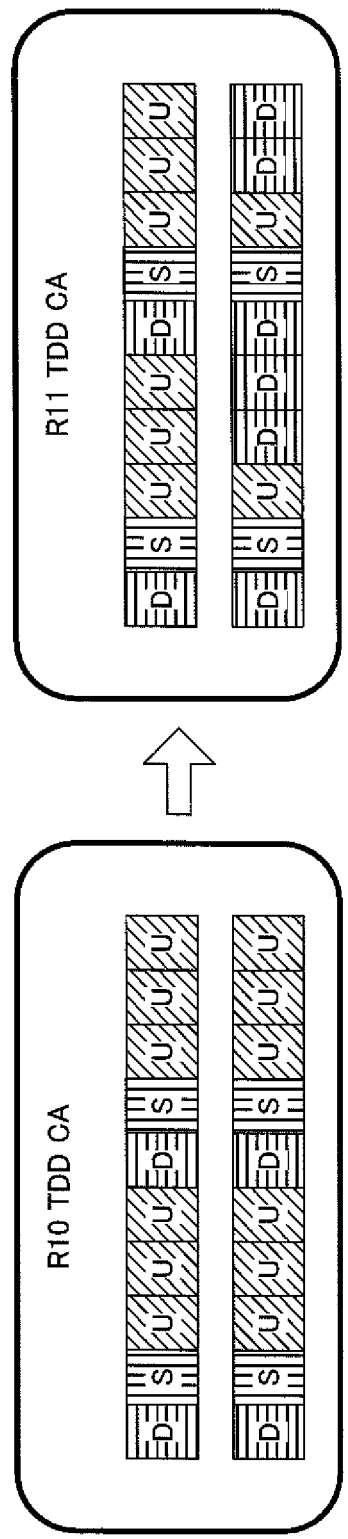
FIG. 1 provides diagrams to explain carrier aggregation in TDD.
Figure 2:
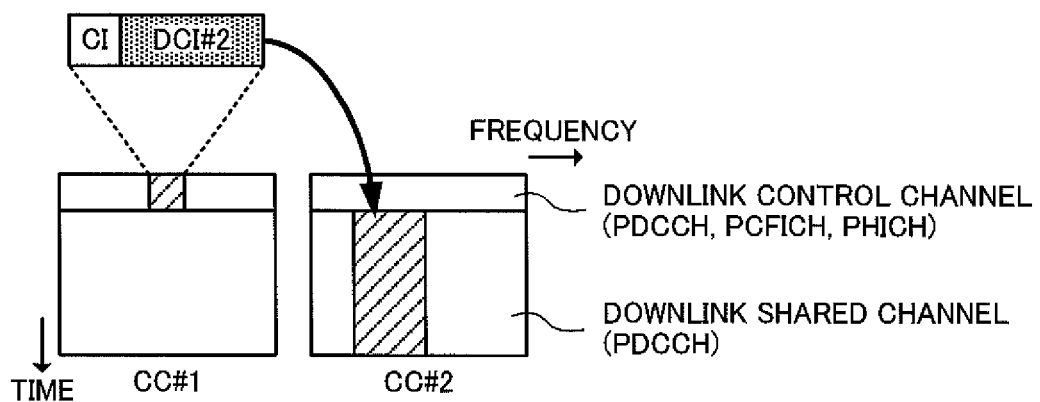
FIG. 2 is a diagram to explain cross-carrier scheduling.
Figure 3:
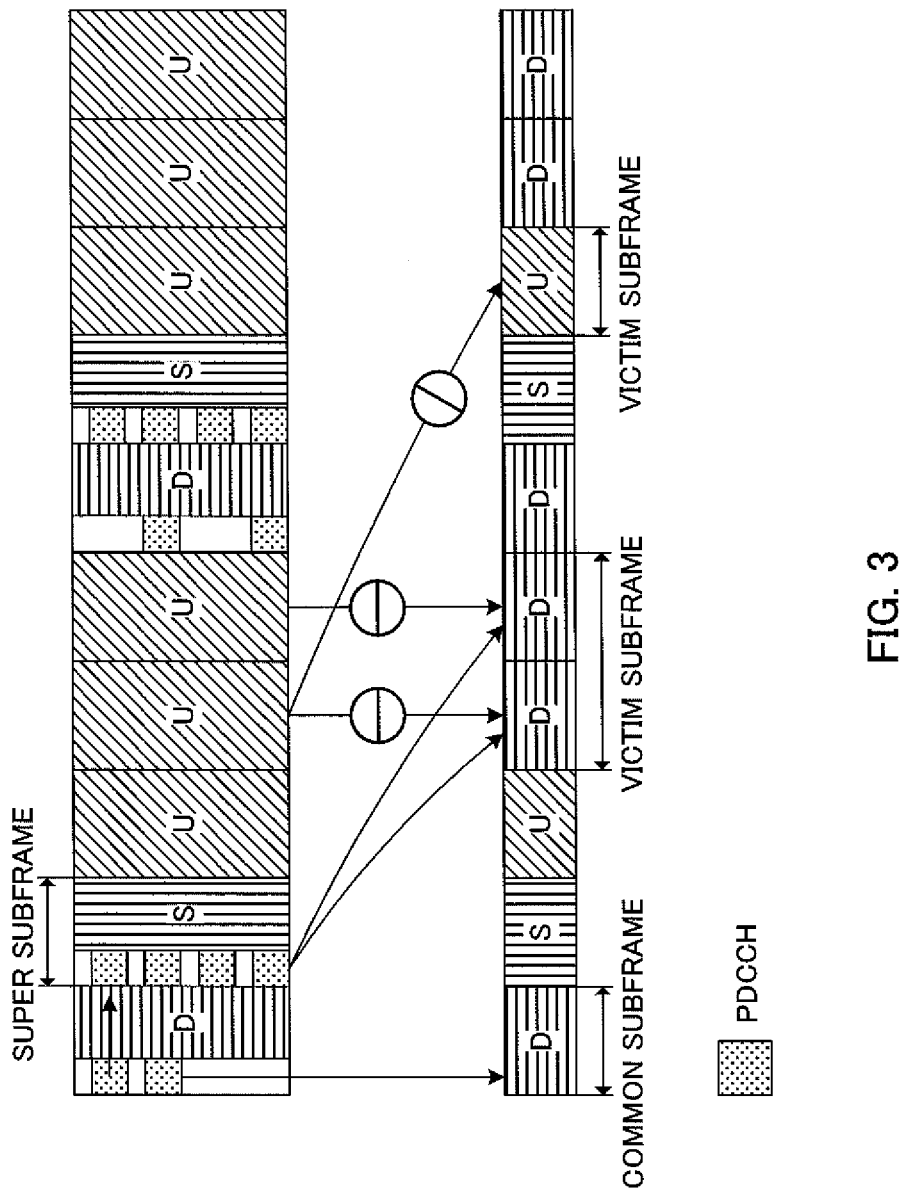
FIG. 3 is a diagram to show a case where the ratio of uplink subframes and downlink subframes is changed in each component carrier in TDD carrier aggregation.

As described above, when the ratio of uplink subframes and downlink subframes is changed in each component carrier in TDD carrier aggregation, a case might occur where, as shown in FIG. 3, subframes of the S-cell cannot be scheduled in the P-cell if the number of downlink subframes in the P-cell is smaller than the number of downlink subframes in the S-cell.

Figure 4:
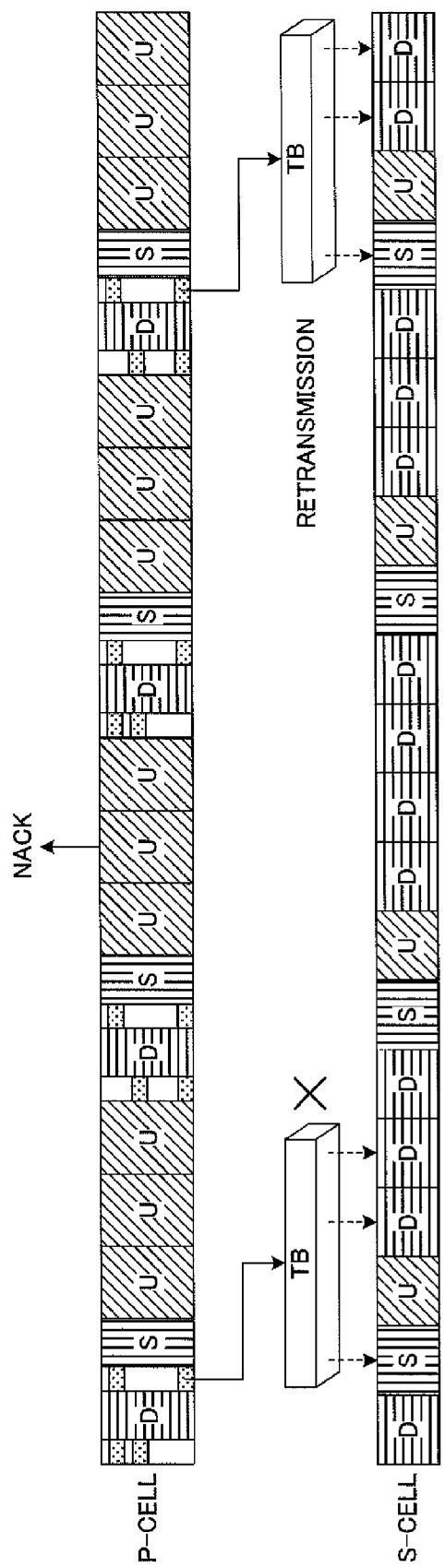
FIG. 4 is a diagram to explain a case where one HARQ process is applied to scheduling information of three victim subframes.

In this case, as shown in FIG. 4, scheduling victim subframes in the S-cell by a super subframe (S-subframe) of the P-cell is under study. With this method, a plurality of victim subframes are scheduled using the PDCCH signal in an S-subframe. In FIG. 4, victim subframes of the S-cell (the second, fourth and fifth subframes from the left) are scheduled using the PDCCH signal of an S-subframe of the P-cell.

In this case, scheduling information for the three victim subframes is included in one transport block. That is to say, one HARQ process is applied to scheduling information for three victim subframes. In this way, when one HARQ process is applied to scheduling information for three victim subframes, a retransmission is required unless all of the scheduling information results in ACK. That is to say, when just one piece of scheduling information in the scheduling information for three victim subframes results in failed delivery (NACK), even when there is scheduling information that has been delivered (ACK), NACK is given on the whole, and therefore a retransmission is required and the transmission rate decreases. Also, after the situation of delivery/failed delivery has been confirmed with respect to all of the scheduling information for three victim subframes, a retransmission is executed after a predetermined period is over, and therefore the retransmission time becomes long.

Also, the number of victim subframes to be scheduled in an S-subframe is reported from a radio base station apparatus to a user terminal by higher layer signaling. Consequently, it is not possible to change the number of victim subframes to schedule in an S-subframe unless the number of victim subframes to be scheduled in the S-subframe is changed by higher layer signaling. Consequently, the overhead of higher layer signaling grows bigger, and also the freedom of scheduling decreases.

So, the present inventors have focused on the CIF (carrier indicator field) of downlink control information, and arrived at the present invention upon finding out that it is possible to dynamically report the number of victim subframes to schedule in an S-subframe to a user terminal by defining information about this CIF as information that associates the carrier index (CI) and the number of victim subframes to schedule in an S-subframe.

Figure 5:
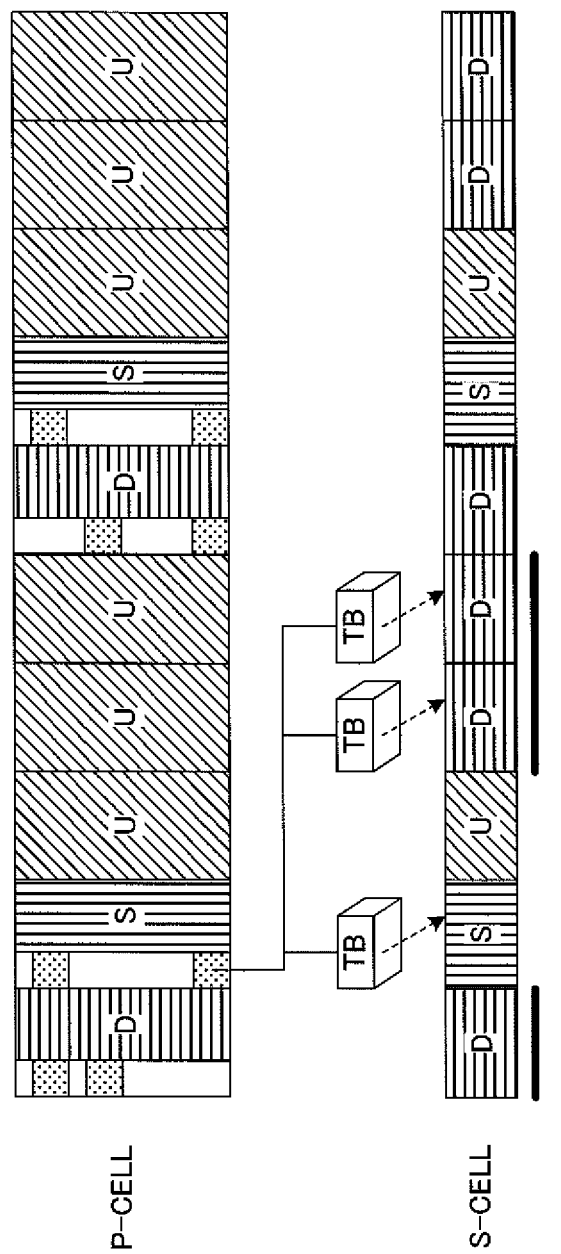
FIG. 5 is a diagram to explain a case where HARQ processes are applied separately to scheduling information of victim subframes.

Also, in this case, scheduling information for one victim subframe is included in one transport block—that is to say, as shown in FIG. 5, HARQ processes are applied separately, per victim subframe scheduling information. By this means, HARQ processes are applied per scheduling information of a victim subframe, so that a case where NACK is given on the whole even though there is scheduling information that has been delivered (ACK) and a wasteful retransmission is executed does not occur, so that it is possible to improve the transmission rate. Also, since separate HARQ processes are applied per victim subframe scheduling information, so that the retransmission time does not become long.

In this way, according to the present invention, even when the ratio of uplink subframes and downlink subframes is changed in each component carrier in TDD carrier aggregation, it is possible to prevent the decrease of capacity, and it is also possible to prevent the transmission rate from decreasing and the retransmission time from becoming long, so that, consequently, it is possible to improve the freedom of scheduling.

With the present invention, carrier indicator field information (CIF) is information which associates the carrier index (CI) and the number of subframes to schedule victim subframes. This association will be described using FIG. 6 to FIG. 10. FIG. 6A, FIG. 7A, FIG. 8A, FIG. 9A, and FIG. 10A are diagrams to show the relationship between downlink control information and search spaces, and FIG. 6B, FIG. 7B, FIG. 8B, FIG. 9B and FIG. 10B are diagrams to show tables which associate carrier indices and the numbers of subframes to schedule victim subframes.

Figures 6A, 6B:
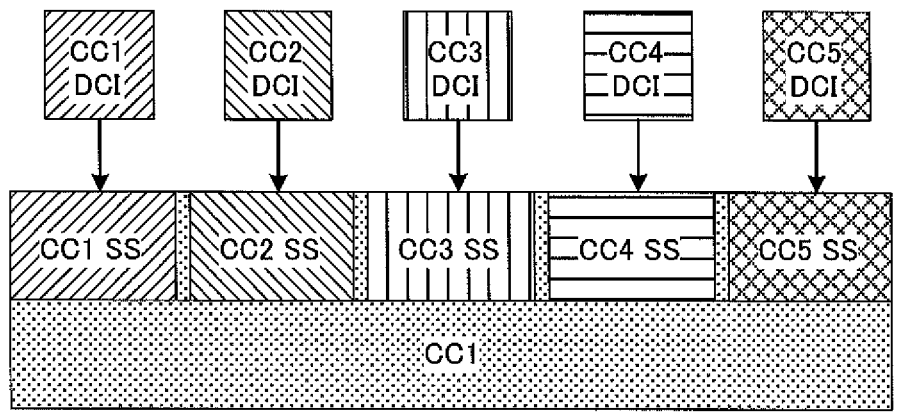
FIG. 6 provides a diagram to show the relationship between downlink control information and search spaces, and a diagram to show a table in which carrier indices and the numbers of subframes to schedule victim subframes are associated.

In FIG. 6A, the PDCCH (Physical Downlink Control Channel) of one component carrier (CC) (P-cell) is shown. In the case shown in FIG. 6A, search spaces for a plurality of component carriers (the P-cell and the S-cell) are provided separately. In each search space, downlink control information (DCI) is multiplexed. In FIG. 6A, from the left, the search space where the DCI of CC 1 is multiplexed, the search space where the DCI of CC 2 is multiplexed, the search space where the DCI of CC 3 is multiplexed, the search space where the DCI of CC 4 is multiplexed, and the search space where the DCI of CC 5 is multiplexed, are arranged. Note that, in this case, the DCI size of each CC varies.

In the case shown in FIG. 6A, each CC has a varying DCI size, so that, even when the search spaces of individual CCs overlap, it is still possible to identify the CCs, and therefore the CIFs for carrier identification are not necessary. Consequently, a CIF, which is formed with three bits, becomes all redundancy bits. With the present invention, these redundancy bits are allocated to the number of subframes to schedule victim subframes (the number of neighboring subframes to require scheduling of victim subframes). The table shown in FIG. 6B is a table in which bits are allocated to the number of scheduling subframes in the search space configuration shown in FIG. 6A. As clear from FIG. 6B, the number of scheduling subframes is associated with the CIF bits. That is to say, by the table of FIG. 6B, three CIF bits are all associated with the numbers of scheduling subframes, so that it is possible to report eight patterns of numbers of scheduling subframes. Note that the CI value X in the table means the CI of each CC.

Figures 7A, 7B:
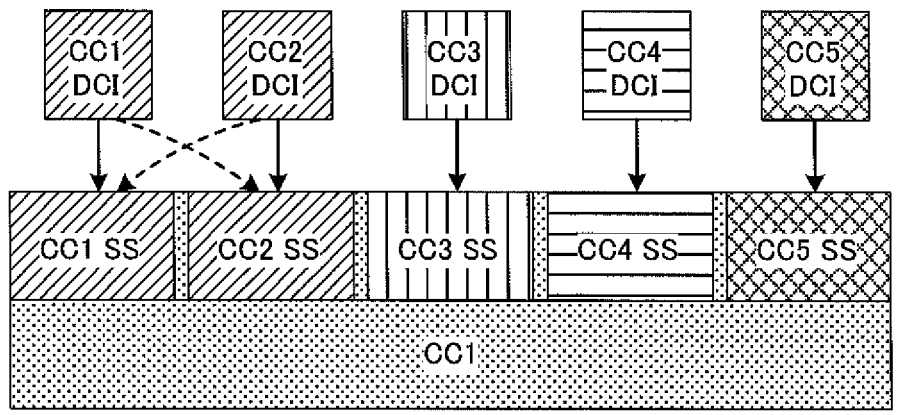
FIG. 7 provides a diagram to show the relationship between downlink control information and search spaces, and a diagram to show a table in which carrier indices and the numbers of subframes to schedule victim subframes are associated.

In the case shown in FIG. 7A, CC 1 (P-cell) and CC 2 (S-cell) have the same bandwidth and transmission mode, and, in this case, CC 1 and CC 2 have the same DCI size and therefore can share the search spaces (CC 1 SS and CC 2 SS), and, meanwhile, the other component carriers (S-cell) each have a DCI size that is different from that of CC 1 and CC 2, and therefore the search spaces are provided separately. In each search space, downlink control information (DCI) is multiplexed. In FIG. 7A, from the left, the search space where the DCI of CC 1 is multiplexed, the search space where the DCI of CC 2 is multiplexed, the search space where the DCI of CC 3 is multiplexed, the search space where the DCI of CC 4 is multiplexed, and the search space where the DCI of CC 5 is multiplexed, are arranged. Note that, in this case, CC 1 and CC 2 need to have the same DCI size, but the other CCs may all have different DCI sizes.

In the case shown in FIG. 7A, the search spaces of CC 1 and CC 2 can be shared, and the search spaces for the other component carriers are provided separately, so that the CIF for carrier identification requires one bit for CC 1 and CC 2. Consequently, two bits of the CIF, which is formed with three bits, become redundancy bits. With the present invention, these redundancy bits are allocated to the number of subframes to schedule victim subframes (the number of neighboring subframes to require scheduling of victim subframes). The table shown in FIG. 7B is a table in which bits are allocated to the number of scheduling subframes in the search space configuration shown in FIG. 7A. As clear from FIG. 7B, the number of scheduling subframes is associated with the CIF bits. That is to say, by the table of FIG. 7B, two CIF bits are all associated with the numbers of scheduling subframes, so that it is possible to report four patterns of numbers of scheduling subframes for each of CC 1 and CC 2.

Figures 8A, 8B:
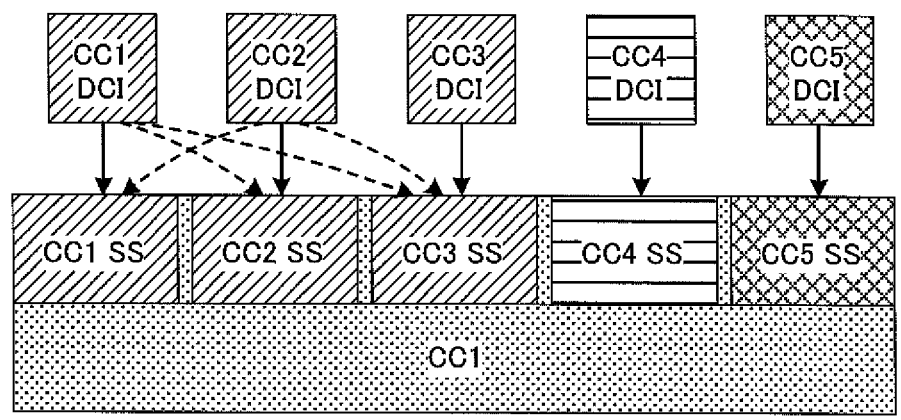
FIG. 8 provides a diagram to show the relationship between downlink control information and search spaces, and a diagram to show a table in which carrier indices and the numbers of subframes to schedule victim subframes are associated.

In the case shown in FIG. 8A, CC 1 (P-cell), CC 2 (S-cell) and CC 3 (S-cell) have the same bandwidth and transmission mode, and, in this case, CC 1, CC 2 and CC 3 have the same DCI size and therefore can share the search spaces (CC 1 SS, CC 2 SS and CC 3 SS), and, meanwhile, the other component carriers (S-cell) each have a DCI size that is different from that of CC 1, CC 2 and CC 3, and therefore the search spaces are provided separately. In each search space, downlink control information (DCI) is multiplexed. In FIG. 8A, from the left, the search space where the DCI of CC 1 is multiplexed, the search space where the DCI of CC 2 is multiplexed, the search space where the DCI of CC 3 is multiplexed, the search space where the DCI of CC 4 is multiplexed, and the search space where the DCI of CC 5 is multiplexed, are arranged. Note that, in this case, CC 1, CC 2 and CC 3 need to have the same DCI size, but the other CCs may all have different DCI sizes.

In the case shown in FIG. 8A, the search spaces of CC 1, CC 2 and CC 3 are shared, and the search spaces for the other component carriers are provided separately, so that the CIF for carrier identification requires more than one bit for CC 1, CC 2 and CC 3. Consequently, fewer bits than two bits of the CIF, which is formed with three bits, become redundancy bits. With the present invention, these redundancy bits are allocated to the number of subframes to schedule victim subframes (the number of neighboring subframes to require scheduling of victim subframes). The table shown in FIG. 8B is a table in which bits are allocated to the number of scheduling subframes in the search space configuration shown in FIG. 8A. As clear from FIG. 8B, the number of scheduling subframes is associated with the CIF bits. That is to say, by the table of FIG. 8B, three patterns of numbers of scheduling subframes are associated with respect to CC 1 and CC 2, and two patterns of numbers of scheduling subframes are associated with respect to CC 3, so that it is possible to report three patterns of numbers of scheduling subframes for each of CC 1 and CC 2 and report two patterns of numbers of scheduling subframes for CC 3.

Figures 9A, 9B:
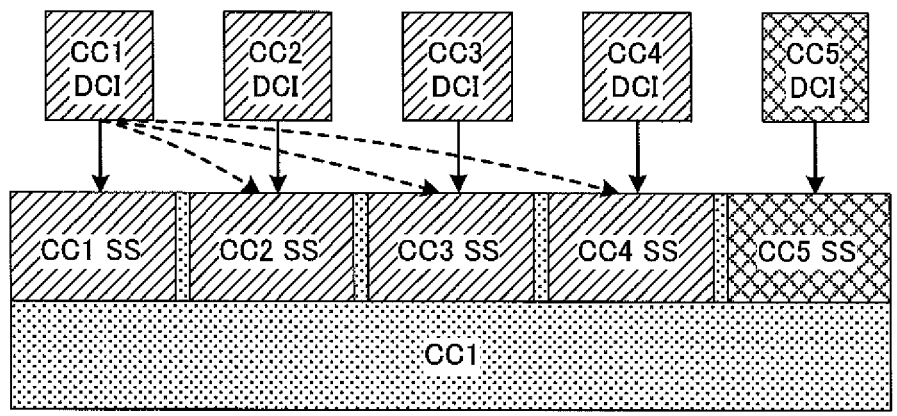
FIG. 9 provides a diagram to show the relationship between downlink control information and search spaces, and a diagram to show a table in which carrier indices and the numbers of subframes to schedule victim subframes are associated.

In the case shown in FIG. 9A, CC 1 (P-cell), CC 2 (S-cell), CC 3 (S-cell) and CC 4 (S-cell) have the same bandwidth and transmission mode, and, in this case, CC 1, CC 2, CC 3 and CC 4 have the same DCI size and therefore can share the search spaces (CC 1 SS, CC 2 SS, CC 3 SS and CC 4 SS), and, meanwhile, the other component carriers (S-cell) each have a DCI size that is different from that of CC 1, CC 2, CC 3 and CC 4, and therefore the search spaces are provided separately. In each search space, downlink control information (DCI) is multiplexed. In FIG. 9A, from the left, the search space where the DCI of CC 1 is multiplexed, the search space where the DCI of CC 2 is multiplexed, the search space where the DCI of CC 3 is multiplexed, the search space where the DCI of CC 4 is multiplexed, and the search space where the DCI of CC 5 is multiplexed, are arranged. Note that, in this case, CC 1, CC 2, CC 3 and CC 4 need to have the same DCI size, but the other CC may all have different DCI sizes.

In the case shown in FIG. 9A, the search spaces of CC 1, CC 2, CC 3 and CC 4 are shared, and the search spaces for the other component carriers are provided separately, so that the CIF for carrier identification requires two bits for CC 1, CC 2, CC 3 and CC 4. Consequently, one bit of the CIF, which is formed with three bits, becomes a redundancy bits. With the present invention, this redundancy bit is allocated to the number of subframes to schedule victim subframes (the number of neighboring subframes to require scheduling of victim subframes). The table shown in FIG. 9B is a table in which bits are allocated to the number of scheduling subframes in the search space configuration shown in FIG. 9A. As clear from FIG. 9B, the number of scheduling subframes is associated with the CIF bit. That is to say, by the table of FIG. 9B, one CIF bit is associated with the number of scheduling subframes, so that it is possible to report two patterns of numbers of scheduling subframes for each of CC 1, CC 2, CC 3 and CC 4.

Figures 10A, 10B:
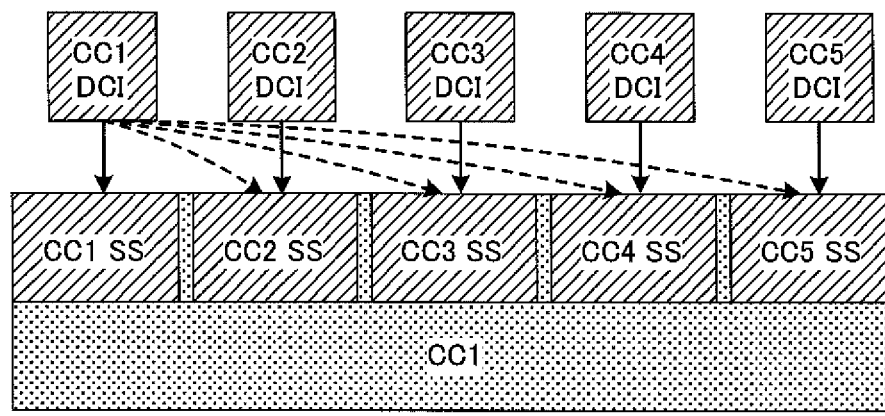
FIG. 10 provides a diagram to show the relationship between downlink control information and search spaces, and a diagram to show a table in which carrier indices and the numbers of subframes to schedule victim subframes are associated.

In the case shown in FIG. 10A, the DCI sizes of CC 1 (P-cell), CC 2 (S-cell), CC 3 (S-cell), CC 4 (S-cell) and CC 5 (S-cell) are different from CC 1, CC 2, CC 3, CC 4 and CC 5, respectively, so that the search spaces (CC 1 SS, CC 2 SS, CC 3 SS, CC 4 SS and CC 5 SS) can be shared. In each search space, downlink control information (DCI) is multiplexed. In FIG. 10A, from the left, the search space where the DCI of CC 1 is multiplexed, the search space where the DCI of CC 2 is multiplexed, the search space where the DCI of CC 3 is multiplexed, the search space where the DCI of CC 4 is multiplexed, the search space where the DCI of CC 5 is multiplexed are arranged. Note that, in this case, CC 1, CC 2, CC 3, CC 4 and CC 5 all need to have the same DCI size.

In the case shown in FIG. 10A, the search spaces of CC 1, CC 2, CC 3, CC 4 and CC 5 are shared, so that the CIF for carrier identification requires more than two bits for CC 1, CC 2, CC 3, CC 4 and CC 5. Consequently, fewer bits than one bit of the CIF, which is formed with three bits, become redundancy bits. With the present invention, this redundancy bit is allocated to the number of subframes to schedule victim subframes (the number of neighboring subframes to require scheduling of victim subframes). The table shown in FIG. 10B is a table in which bits are allocated to the number of scheduling subframes in the search space configuration shown in FIG. 10A. As clear from FIG. 10B, the number of scheduling subframes is associated with the CIF bits. That is to say, by the table of FIG. 10B, two patterns of numbers of scheduling subframes are associated with respect to CC 1, CC 2 and CC 3, and one pattern of a number of scheduling subframes is associated with respect to CC 4 and CC 5, so that it is possible to report two patterns of numbers of scheduling subframes for each of CC 1, CC 2 and CC 3 and report one pattern of a number of scheduling subframes for each of CC 4 and CC 5.

With the present invention, it is equally possible to provide a plurality of tables such as the ones shown in FIG. 6 to FIG. 10 in a radio base station apparatus and use an adequate table depending on the mode of cross-carrier scheduling. Note that the tables shown in FIG. 6 to FIG. 10 are simply examples and are by no means limited to these. Also, the CIF that is formed with three bits is by no means limiting, and it is equally possible to use a CIF that is extended to four bits or more. This may include newly adding, apart from the CIF, an indicator for reporting the number of subframes to schedule victim subframes, to DCI.

Figure 11:
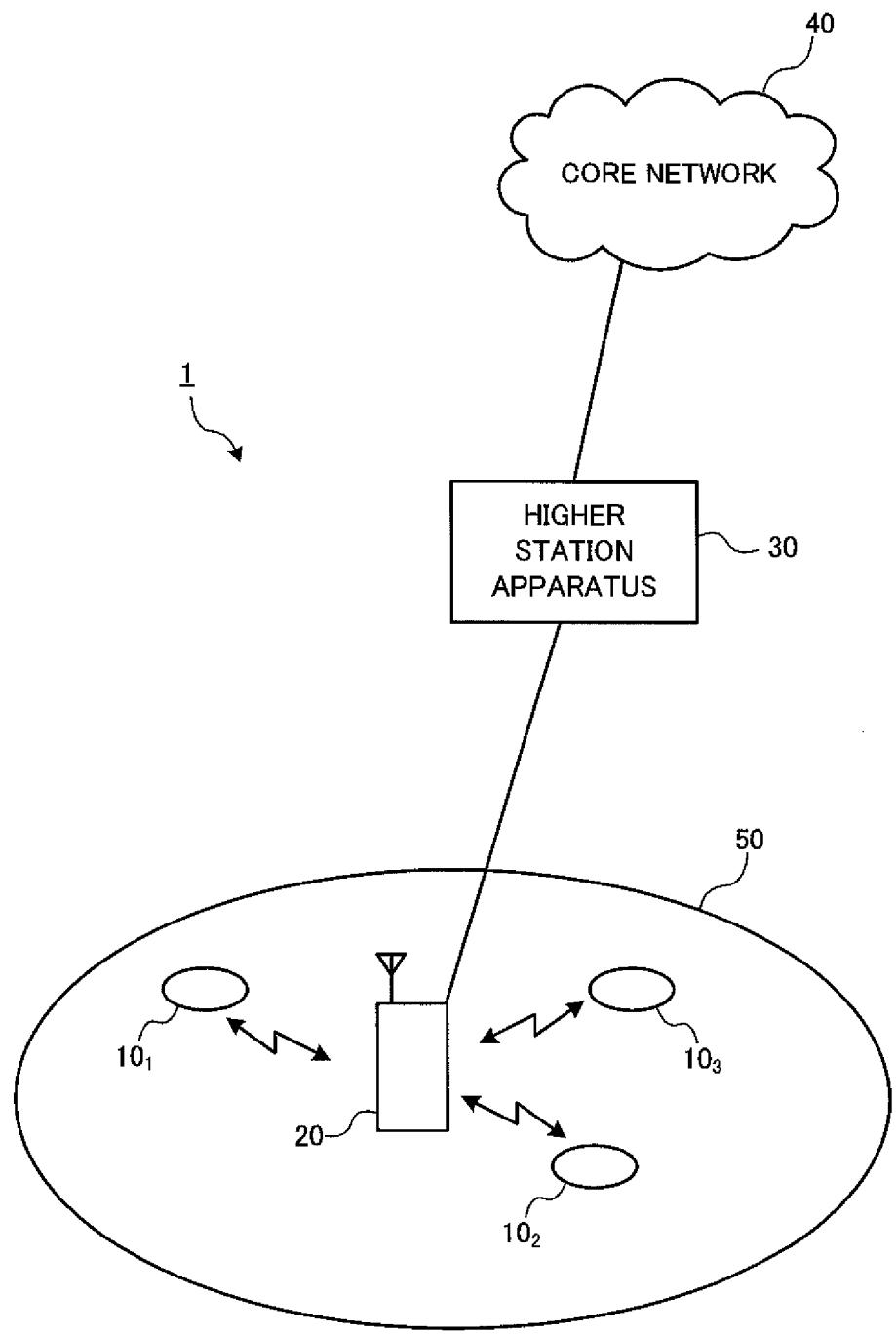
FIG. 11 is a diagram to explain a system configuration of a radio communication system.

Now, a radio communication system according to an embodiment of the present invention will be described in detail. FIG. 11 is a diagram to explain a system configuration of a radio communication system according to the present embodiment. Note that the radio communication system shown in FIG. 11 is a system to accommodate, for example, the LTE system or SUPER 3G. In this radio communication system, carrier aggregation, which groups a plurality of fundamental frequency blocks into one, where the system band of the LTE system is one unit, is used. Also, this radio communication system may be referred to as "IMT-Advanced" or may be referred to as "4G."

As shown in FIG. 11, a radio communication system 1 is configured to include a radio base station apparatus 20, and a plurality of user terminals $10_1$, $10_2$ and $10_3$ that communicate with this radio base station apparatus 20. This radio communication system 1 makes broadbandization possible by performing radio communication between the radio base station apparatus and the user terminals by time division duplexing and by carrier aggregation. Also, even when the radio communication system 1 adopts a configuration in which there are fewer downlink subframes in the P-cell than the downlink subframes in the S-cell, victim subframes in the S-cell are scheduled in S-subframes in the P-cell.

The radio base station apparatus 20 is connected with a higher station apparatus 30, and this higher station apparatus 30 is connected with a core network 40. Also, the radio base station apparatuses 20 are connected with each other by wire connection or by wireless connection. The user terminals $10_1$, $10_2$ and $10_3$ are able to communicate with the radio base station apparatus 20 in a cell 50. Note that the higher station apparatus 30 includes, for example, an access gateway apparatus, a radio network controller (RNC), a mobility management entity (MME) and so on, but is by no means limited to these.

The user terminals $10_1$, $10_2$ and $10_3$ include LTE terminals and LTE-A terminals. Also, although, for ease of explanation, the radio base station apparatus 20 and the user terminals $10_1$, $10_2$ and $10_3$ will be described to perform radio communication, more generally, user devices (UEs), including user terminals as well as fixed terminal apparatuses, may also be used.

In the radio communication system 1, as radio access schemes, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

The downlink communication channels include a PDSCH, which is used by the user terminals $10_1$, $10_2$, and $10_3$ on a shared basis as a downlink data channel, and downlink L1/L2 control channels (PDCCH, PCFICH, PHICH). Transmission data and higher control information are transmitted by the PDSCH. PDSCH and PUSCH scheduling information and so on are transmitted by the PDCCH. The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator CHannel).

The uplink communication channels include a PUSCH (Physical Uplink Shared Channel), which is used by the user terminals on a shared basis as an uplink data channel, and a PUCCH (Physical Uplink Control Channel), which is an uplink control channel. By means of this PUSCH, transmission data and higher control information are transmitted. Furthermore, downlink received quality information (CQI), ACK/NACK, and so on are transmitted by the PUCCH.

Figure 12:
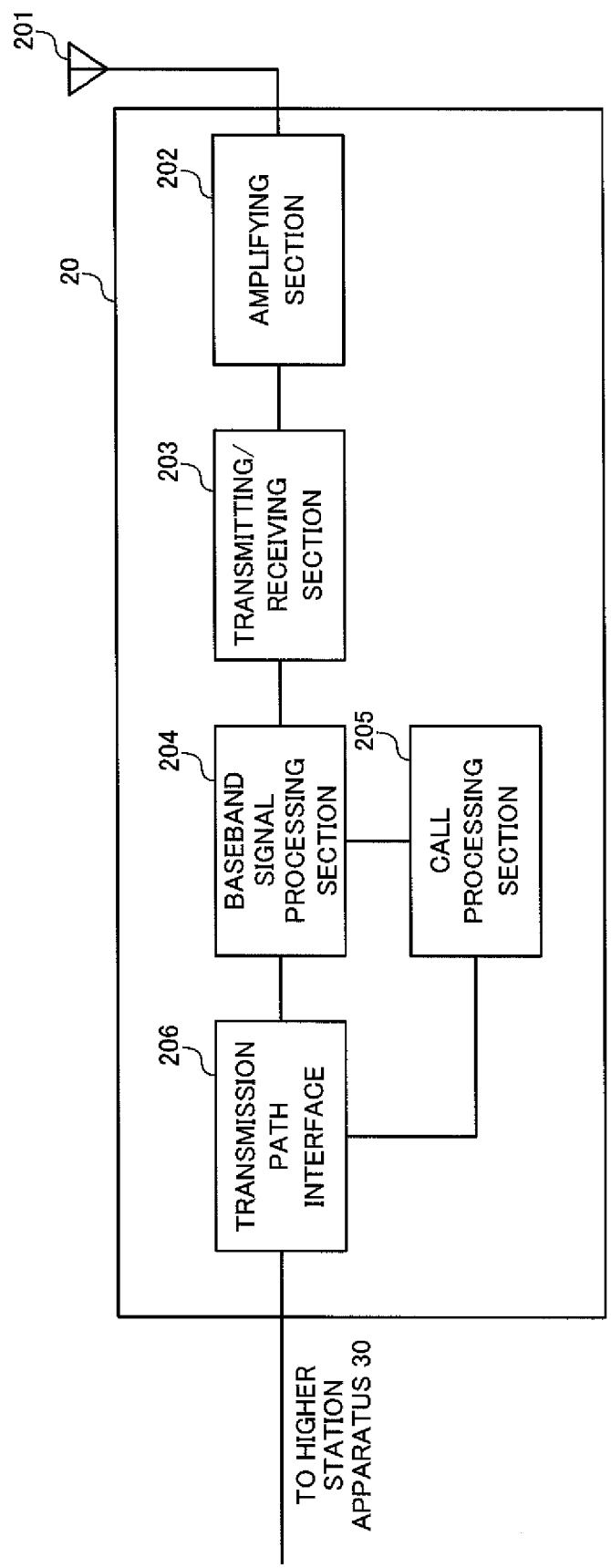
FIG. 12 is a diagram to explain an overall configuration of a radio base station apparatus.

Referring to FIG. 12, an overall configuration of the radio base station apparatus according to the present embodiment will be described. The radio base station apparatus 20 includes a transmitting/receiving antennas 201, an amplifying section 202, a transmitting/receiving section (reporting section) 203, a baseband signal processing section 204, a call processing section 205, and a transmission path interface 206. Transmission data to be transmitted from the radio base station apparatus 20 to the user terminals on the downlink is input from the higher station apparatus 30, into the baseband signal processing section 204, via the transmission path interface 206.

In the baseband signal processing section 204, a downlink data channel signal is subject to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

With the present invention, HARQ processes for scheduling information for victim subframes are applied separately. That is to say, as shown in FIG. 5, when a plurality of (three in FIG. 5) victim subframes of the S-cell are scheduled in one S-subframe of the P-cell, a plurality of (three in FIG. 5) independent transport blocks are generated, and scheduling information for the three victim subframes is reported in one PDCCH. In this case, in order not to increase the DCI size, a method of sharing the scheduling information (allocation information, MCS and so on) for the three subframes may be used. In FIG. 5, separate HARQ processes are applied to each victim subframe (scheduling information for the second subframe from the left, the fourth subframe from the left, and the fifth subframe from the left). By this means, wasteful retransmissions are not made, so that it is possible to improve the transmission rate and prevent the time of retransmission from becoming long.

Also, the baseband signal processing section 204 reports control information for allowing each user terminal 10 to perform radio communication with the radio base station apparatus 20, to the user terminals 10 connected to the same cell, by a broadcast channel. Information for communication in the cell includes, for example, the system bandwidth on the uplink or the downlink, identification information of a root sequence (root sequence index) for generating signals of random access preambles of the PRACH (Physical Random Access Channel), and so on.

The baseband signal that is output from the baseband signal processing section 204 is converted into a radio frequency band in the transmitting/receiving section 203. The amplifying section 202 amplifies the radio frequency signal having been subjected to frequency conversion, and outputs the result to the transmitting/receiving antennas 201. Note that the transmitting/receiving section 203 constitutes a transmission means to transmit downlink signals including the PDCCH signal, to the user terminals.

On the other hand, as for signals to be transmitted from the user terminals 10 to the radio base station apparatus 20 on the uplink, radio frequency signals that are received in the transmitting/receiving antennas 201 are amplified in the amplifying section 202, converted into baseband signals by frequency conversion in the transmitting/receiving section 203, and input in the baseband signal processing section 204.

The baseband signal processing section 204 performs an FFT (Fast Fourier Transform) process, an IDFT (Inverse Discrete Fourier Transform) process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the radio base station apparatus 20 and manages the radio resources.

Figure 13:
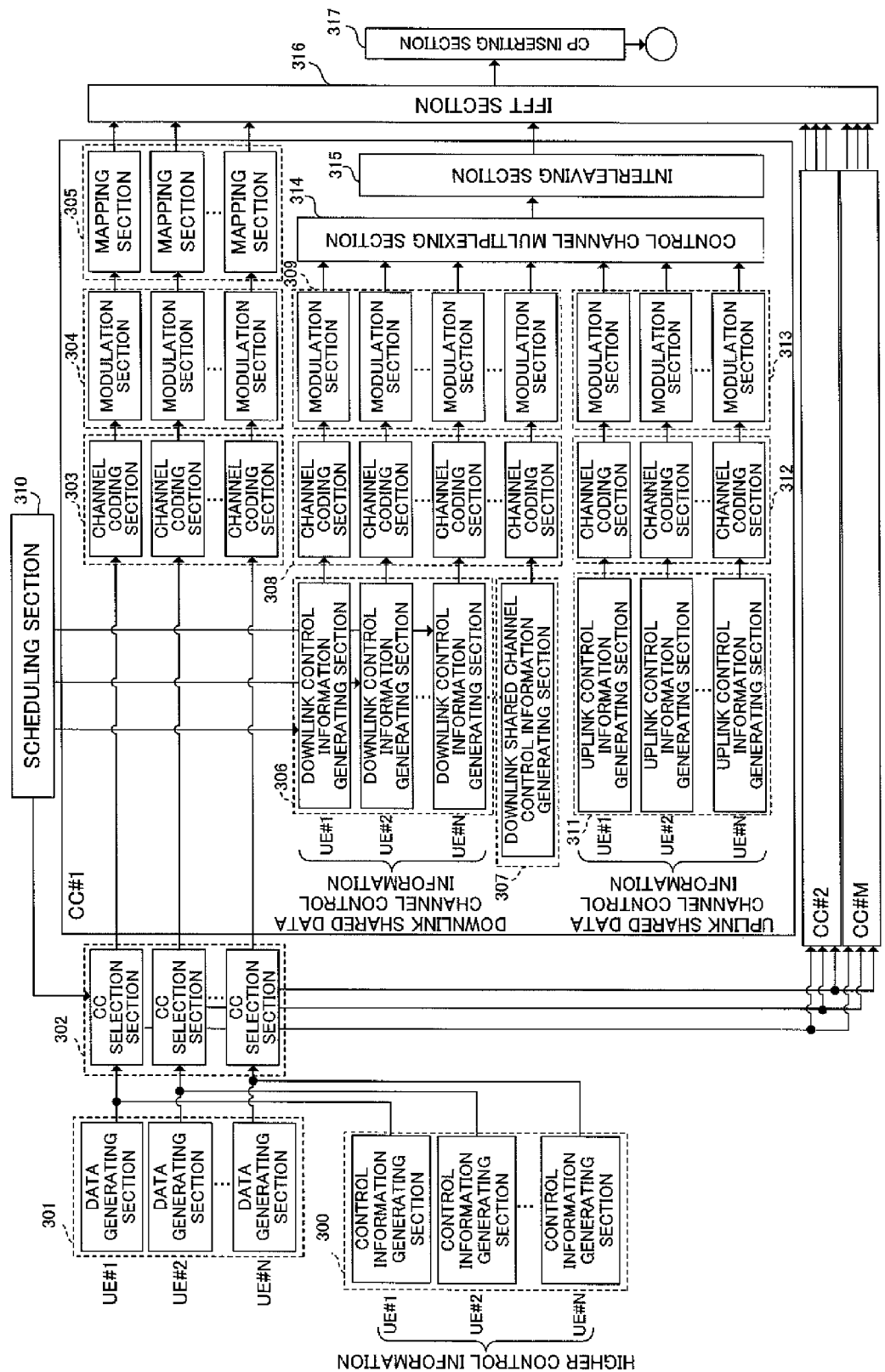
FIG. 13 is a functional block diagram corresponding to a baseband processing section of a radio base station apparatus.

FIG. 13 is a block diagram showing a configuration of a baseband signal processing section in the radio base station apparatus shown in FIG. 12. The baseband signal processing section 204 in FIG. 13 primarily shows the function blocks of a transmission processing section. FIG. 13 shows an example of a base station configuration which can support maximum M component carriers (CC #1 to CC #M). Transmission data for user terminals 10 under the radio base station apparatus 20 is transferred from the higher station apparatus 30 to the radio base station apparatus 20.

Control information generating sections 300 generate higher control signals for performing higher layer signaling (for example, RRC signaling), on a per user basis. Data generating sections 301 output transmission data transferred from the higher station apparatus 30 as user data, separately.

The component carrier selection sections 302 select component carriers to be used for radio communication with the user terminals 10, on a per user basis. As described above, an increase/decrease of component carriers is reported from the radio base station apparatus 20 to the user terminals 10 by RRC signaling, and complete messages are received from the user terminals 10. When the complete messages are received, allocation (addition/removal) of component carriers to the users is fixed, and the fixed component carrier allocation is set in the component carrier selection sections 302 as component carrier allocation information. In accordance with the component carrier allocation information that is set in the component carrier selection sections 302 on a per user basis, higher control signals and transmission data are allocated to the channel coding sections 303 of the applicable component carriers. Component carriers are allocated so that an anchor carrier is included in the component carriers selected by the component carrier selection sections 302.

The scheduling section 310 controls allocation of component carriers to the user terminals 10 under control, according to overall communication quality of the system band. The scheduling section 310 determines the addition/removal of component carriers to allocate for communication with the user terminals 10. A result determined in relationship to the addition/removal of component carriers is reported to the control information generating sections 300.

The scheduling section 310 controls the allocation of resources in each of component carriers CC #1 to CC #M. Scheduling is separately performed between LTE terminal users and LTE-A terminal users. The scheduling section 310 receives as input transmission data and retransmission commands from the higher station apparatus 30, and also receives as input the channel estimation values and resource block CQIs from a receiving section having measured uplink signals. The scheduling section 310 schedules uplink/downlink control signals and uplink/downlink shared channel signals, with reference to the retransmission commands input from the higher station apparatus 30, the channel estimation values and CQIs. A propagation path in mobile communication varies differently per frequency, due to frequency selective fading. So, upon user data transmission to the user terminals 10, resource blocks of good communication quality are allocated to the user terminals 10 on a per subframe basis (which is referred to as "adaptive frequency scheduling"). In adaptive frequency scheduling, a user terminal 10 of good propagation path quality is selected and allocated to each resource block. Consequently, the scheduling section 310 allocates resource blocks, using the CQI of each resource block, fed back from each user terminal 10. Also, the MCS (coding rate and modulation scheme) that fulfills a predetermined block error rate with the allocated resource blocks is determined. Parameters that satisfy the MCS (coding rate and modulation scheme) determined by the scheduling section 310 are set in channel coding sections 303, 308 and 312, and modulation sections 304, 309 and 313. The scheduling section 310 schedules S-subframes, C-subframes, and V-subframes, on a per CC basis.

The baseband signal processing section 204 has channel coding sections 303, modulation sections 304 and mapping sections 305 to support the maximum number of users to multiplex, N, in one component carrier. The channel coding sections 303 perform channel coding of the shared data channel (PDSCH), formed with user data (including part of higher control signals) that is output from the data generating sections 301, on a per user basis. The modulation sections 304 modulate user data having been subjected to channel coding, on a per user basis. The mapping sections 305 map the modulated user data to radio resources.

Also, the baseband signal processing section 204 has downlink control information generating sections 306 that generate downlink shared data channel control information, which is user-specific downlink control information, and a downlink shared channel control information generating section 307 that generates downlink shared control channel control information, which is user-common downlink control information.

The downlink control information generating sections 306 generate downlink control information (DCI) from the resource allocation information, MCS information, HARQ information, PUCCH transmission power control command and so on, determined on a per user basis. The downlink control information generating sections 306 generate DCI, which includes a CIF that associates the CI and the number of subframes to schedule victim subframes. To be more specific, the downlink control information generating sections 306 has a table such as the ones shown in FIG. 6 to FIG. 10, and, with respect to an S-subframe, determines the CIF from information about the CI and the number of subframes to schedule victim subframes, and generates DCI including that CIF. For example, when CC 1 and CC 2 share the search spaces, if the CI is #2 and the number of subframes to schedule victim subframes is three, CIF="110" is determined with reference to the table shown in FIG. 7B, and DCI to include this CIF is generated. Also, the downlink control information generating sections 306 generates DCI including a CI, with respect to a C-subframe. Then, the downlink control channel signal (PDCCH signal) having DCI generated in this way is generated. Also, if necessary, the PDCCH signal includes scheduling information for a number of subframes to schedule victim subframes (for example, in the event of a configuration in which there are fewer downlink subframes in the P-cell than the downlink subframes in the S-cell).

The baseband signal processing section 204 has channel coding sections 308 and modulation sections 309 to support the maximum number of users to multiplex, N, in one component carrier. The channel coding sections 308 perform channel coding of control information generated in the downlink control information generating sections 306 and the downlink shared channel control information generating section 307, on a per user basis. The modulation sections 309 modulate the downlink control information after channel coding.

Also, the baseband signal processing section 204 has uplink control information generating sections 311 that generate uplink shared data channel control information, which is control information for controlling the uplink shared data channel (PUSCH), on a per user basis, channel coding sections 312 that perform channel coding of the generated uplink shared data channel control information on a per user basis, and modulation sections 313 that modulate the uplink shared data channel control information having been subjected to channel coding, on a per user basis.

The control information that is modulated in the modulation sections 309 and 313 on a per user basis is multiplexed in the control channel multiplexing section 314 and furthermore interleaved in the interleaving section 315. A control signal that is output from the interleaving section 315 and user data that is output from the mapping sections 305 are input in an IFFT section 316 as downlink channel signals. The IFFT section 316 performs an inverse fast Fourier transform of the downlink channel signal and converts the frequency domain signals into time domain signals. A cyclic prefix (CP) inserting section 317 inserts cyclic prefixes in the time sequence signal of the downlink channel signal. Note that a cyclic prefix functions as a guard interval for cancelling the differences in multipath propagation delay. Transmission data, to which cyclic prefixes have been added, is transmitted to the transmitting/receiving section 203.

Next, referring to FIG. 14, an overall configuration of a user terminal according to the present embodiment will be described. The user terminal $10_1$, $10_2$, and $10_3$ have the same configuration and therefore will be described simply as "user terminal 10." An LTE terminal and an LTE-A terminal have the same hardware configurations in principle parts, and therefore will be described indiscriminately. The user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT (Discrete Fourier Transform) process, and an IFFT process. The baseband signal that is output from the baseband signal processing section 104 is converted into a radio frequency band in the transmitting/receiving section 103. After that, the amplifying section 102 amplifies the radio frequency signal having been subjected to frequency conversion, and transmits the result from the transmitting/receiving antenna 101. Note that the transmitting/receiving section 103 constitutes a receiving means to receive downlink control channel signals.

Figure 14:
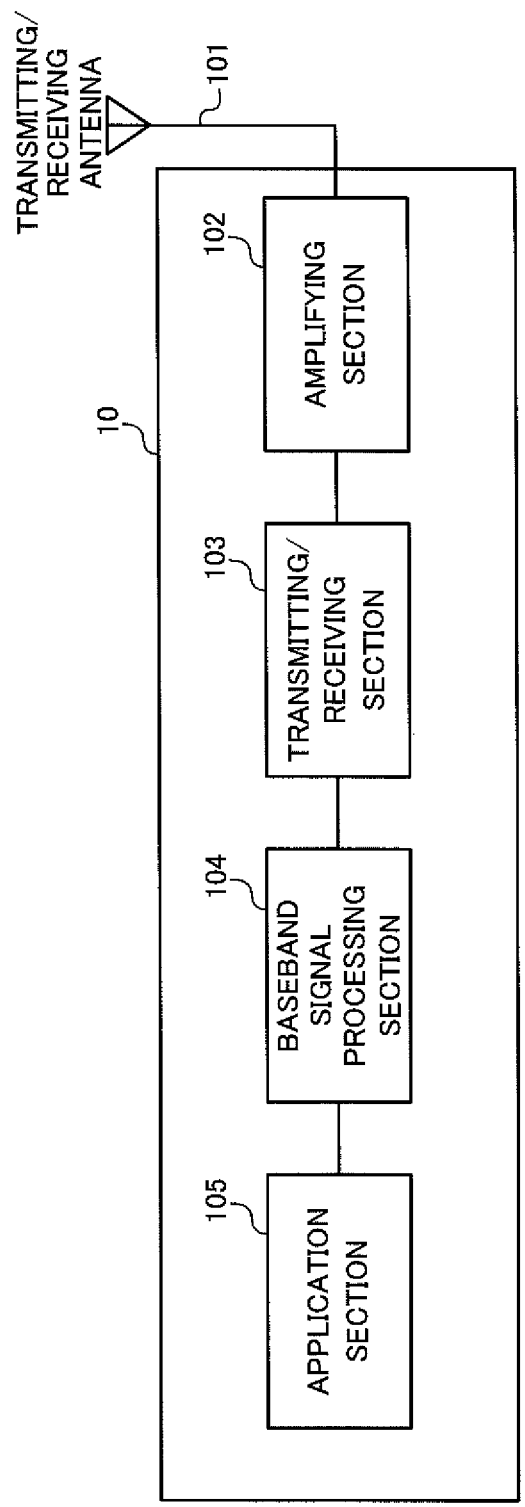
FIG. 14 is a diagram to explain an overall configuration of a user terminal.
Figure 15:
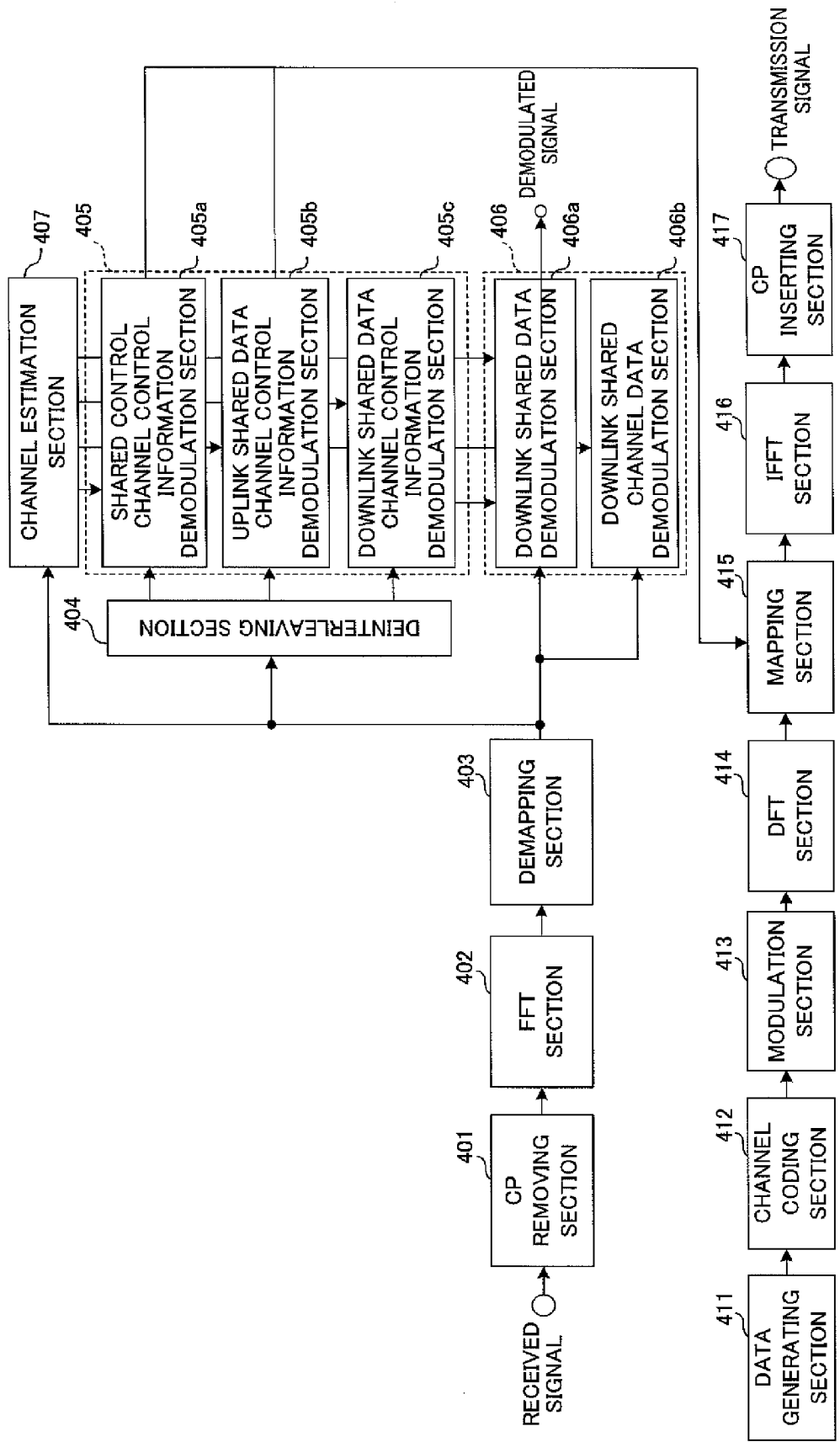
FIG. 15 is a functional block diagram corresponding to a baseband processing section of a user terminal.

FIG. 15 is a block diagram to show a configuration of a baseband signal processing section in the user terminal shown in FIG. 14, and shows the function blocks of an LTE-A terminal which supports LTE-A. First, the downlink configuration of the user terminal 10 will be described. The baseband signal processing section is a signal processing section that executes signal processing with respect to downlink signals according to downlink control information.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal, and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information output from the demapping section 403 is deinterleaved in a deinterleaving section 404.

Also, the baseband signal processing section 104 has control information demodulation sections 405 that demodulate control information, data demodulation sections 406 that demodulate downlink shared data, and a channel estimation section 407. The control information demodulation sections 405 include a shared control channel control information demodulation section 405a that demodulates downlink shared control channel control information from multiplex control information, an uplink shared data channel control information demodulation section 405b that demodulates uplink shared data channel control information from multiplex control information, and a downlink shared data channel control information demodulation section 405c that demodulates downlink shared data channel control information from multiplex control information. The data demodulation sections 406 include a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user-common control information by a blind decoding process of the common search space of the multiplex control information (PDCCH), a demodulation process, a channel decoding process and so on. The shared control channel control information includes downlink channel quality information (CQI), is input in a mapping section 115, which will be described later, and is mapped as part of transmission data for the radio base station apparatus 20.

The shared control channel control information demodulation section 405a extracts the CI and the number of subframes to schedule victim subframes, from the CIF included in the DCI. To be more specific, the shared control channel control information demodulation section 405a has a table such as the ones shown in FIG. 6 to FIG. 10, and, with reference to this table, extracts the CI and the number of subframes to schedule victim subframes, from the CIF included in the DCI. For example, when CC 1 and CC 2 share search spaces, if CIF="110," the shared control channel control information demodulation section 405a finds, with reference to the table shown in FIG. 7B, that the CI is #2 and the number of subframes to schedule victim subframes is three. Information about the CI and the number of subframes to schedule victim subframes found in this way is sent to the downlink shared data channel control information demodulation section 405c, and used in the receiving process of the PDSCH The uplink shared data channel control information demodulation section 405b extracts uplink shared data channel control information, which is user-specific uplink control information, by a blind decoding process of the user-specific search spaces of the multiplex control information (PDCCH), a demodulation process, a channel decoding process and so on. The uplink shared data channel control information is used to control the uplink shared data channel (PUSCH), and is input in the downlink shared channel data demodulation section 406b. Also, the uplink shared data channel control information demodulation section 405b extracts the CI from the DCI, with respect to a C-subframe. This CI is used for the process for transmitting the PUSCH signal.

The downlink shared data channel control information demodulation section 405c extracts downlink shared data channel control information, which is user-specific downlink control signals, by a blind decoding process of the user-specific search spaces of the multiplex control information (PDCCH), a demodulation process, a channel decoding process and so on. The downlink shared data channel control information is used to control the downlink shared data channel (PDSCH), and is input in the downlink shared data demodulation sections 406. Also, the downlink shared data channel control information demodulation section 405c performs receiving processes of the PDSCH signal, based on information about the CI and the number of subframes to schedule victim subframes.

Also, the downlink shared data channel control information demodulation section 405c performs the blind decoding process of the user-specific search spaces, based on information which relates to the PDCCH and the PDSCH and which is included in the higher control signals demodulated in the downlink shared data demodulation section 406a.

The downlink shared data demodulation section 406a acquires user data and higher control information based on the downlink shared data channel control information that is input from the downlink shared data channel control information demodulation section 405c. The higher control information is output to the channel estimation section 407. The downlink shared channel data demodulation section 406b demodulates downlink shared channel data based on the uplink shared data channel control information that is input from the uplink shared data channel control information demodulation section 405b.

The channel estimation section 407 performs channel estimation using common reference signals. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink signals using the estimated channel variation and demodulation reference signals.

The baseband signal processing section 104 has, as functions blocks of the transmission processing system, a data generating sections 411, a channel coding sections 412, a modulation section 413, a DFT section 414, a mapping section 415, an IFFT section 416, and a CP inserting section 417. The data generating sections 411 generates transmission data from bit data that is received as input from the application section 105. The channel coding sections 412 performs channel coding processes such as error correction for the transmission data, and the modulation section 413 modulates the transmission data after channel coding by QPSK and so on. The DFT section 414 performs a discrete Fourier transform of the modulated transmission data. The mapping section 415 maps the frequency components of the data symbols after the DFT to subcarrier positions designated by the radio base station apparatus. That is to say, the mapping section 415 inputs the frequency components of the data symbol in subcarrier positions of the IFFT section 416 having a bandwidth to match the system band, and sets 0's for the other frequency components. The IFFT section 416 converts the input data, which corresponds to the system band, into time sequence data, by performing an inverse fast Fourier transform, and the CP inserting section 417 inserts cyclic prefixes in the time sequence data in data units.

In the radio communication system having the above configuration, the downlink control information generating sections 306 in the radio base station apparatus generate DCI, which includes a CIF associating the CI and the number of subframes to schedule victim subframes. To be more specific, with respect to an S-subframe, a CIF is determined from information about the CI and the number of subframes to schedule victim subframes, and DCI to include that CIF is generated. For example, when a common search space is set for a number of CCs, with reference to the table shown in FIG. 7B, FIG. 8B, FIG. 9B or FIG. 10B, a CIF that associates the CI and the number of subframes to schedule victim subframes is determined, and DCI to include that CIF is generated. For example, when CC 1 and CC 2 share the search spaces, if the CI is #2 and the number of subframes to schedule victim subframes is three, CIF=" 110" is determined with reference to the table shown in FIG. 7B, and DCI to include this CIF is generated. On the other hand, when search spaces are set separately for each CC, as shown in FIG. 6B, CIF is determined from information about the number of subframes to schedule victim subframes, and DCI to include that CIF is generated. In this way, in an S-subframe, victim subframes are scheduled. The radio base station apparatus generates the PDCCH signal having DCI generated in this way, and transmits this PDCCH signal to the user terminal.

The shared control channel control information demodulation section 405a of the user terminal extracts the CI and the number of subframes to schedule victim subframes from the CIF included in the DCI. For example, when a common search space is set for a number of CCs, the shared control channel control information demodulation section 405a extracts the CI and the number of subframes to schedule victim subframes from the CIF, with reference to the table shown in FIG. 7B, FIG. 8B, FIG. 9B or FIG. 10B. For example, when CC 1 and CC 2 share search spaces, if CIF="110," with reference to the table shown in FIG. 7B, it is determined that the CI is #2 and the number of subframes to schedule victim subframes is three. When separate search spaces are set for each CC, if CIF="011," with reference to the table shown in FIG. 6B, it is determined that the number of subframes to schedule victim subframes is four. Using information about the CI and the number of subframes to schedule victim subframes found in this way, the downlink shared data channel control information demodulation section 405c performs the receiving process of the PDSCH signal.

With this control method, information that associates the CI and the number of victim subframes to schedule in an S-subframe is included in the CIF, so that it is possible to dynamically report the number of victim subframes to schedule in the S-subframe to the user terminal. By this means, even when the ratio of uplink subframes and downlink subframes is changed in each component carrier in TDD carrier aggregation, it is possible to prevent the decrease of capacity.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-245865, filed on Nov. 9, 2011, including the specification, drawings, and abstract, is incorporated herein by reference in its entirety.

The invention claimed is:

1. A radio communication system comprising:
   a radio base station apparatus; and
   a user terminal that performs radio communication with the radio base station apparatus by time division duplexing, and which achieves broadbandization by carrier aggregation, wherein:
   the radio base station apparatus comprises:
      a processor of the radio base station that generates a downlink control channel signal containing downlink control information including carrier indicator field information; and
      a transmitter that transmits the downlink control channel signal to the user terminal; and
   the user terminal comprises:
      a receiver that receives the downlink control channel signal; and
      a processor of the user terminal that executes signal processing with respect to a downlink signal in accordance with the downlink control information,
   wherein the carrier indicator field information is information that associates a carrier index and a number of subframes to schedule victim subframes.

2. The radio communication system according to claim 1, wherein, when a configuration in which there are fewer downlink subframes in a configuration of a primary cell than downlink subframes in a configuration of a secondary cell is used, victim subframes in the secondary cell are scheduled by a super subframe in the primary cell.

3. The radio communication system according to claim 2, wherein a separate HARQ process is applied to scheduling information of each victim subframe by the user terminal.

4. The radio communication system according to claim 1, wherein a separate HARQ process is applied to scheduling information of each victim subframe by the user terminal.

5. A radio base station apparatus in a radio communication system, the radio base station apparatus comprising:
   a processor that generates a downlink control channel signal containing downlink control information including carrier indicator field information; and
   a transmitter that transmits the downlink control channel signal to a user terminal,
   wherein the carrier indicator field information is information that associates a carrier index and a number of subframes to schedule victim subframes, and
   wherein the transmitter transmits using time division duplexing, and the processor of the radio base station achieves broadbandization by carrier aggregation.

6. The radio base station apparatus according to claim 5, wherein, when a configuration in which there are fewer downlink subframes in a configuration of a primary cell than downlink subframes in a configuration of a secondary cell is used, victim subframes in the secondary cell are scheduled by a super subframe in the primary cell.

7. The radio base station apparatus according to claim 6, wherein a separate HARQ process is applied to scheduling information of each victim subframe by the user terminal.

8. The radio base station apparatus according to claim 5, wherein a separate HARQ process is applied to scheduling information of each victim subframe by the user terminal.

9. A user terminal in a radio communication system, the user terminal comprising:
   a receiver that receives a downlink control channel signal containing downlink control information including carrier indicator field information from a radio base station; and
   a processor that executes signal processing with respect to a downlink signal in accordance with the downlink control information,
   wherein the carrier indicator field information is information that associates a carrier index and a number of subframes to schedule victim subframes, and
   wherein a transmitter of the radio base station transmits using time division duplexing, and a processor of the radio base station achieves broadbandization by carrier aggregation.

10. A radio communication method in a radio communication system that achieves broadbandization by carrier aggregation, comprising the steps of:
   at a radio base station apparatus:
      generating a downlink control channel signal containing downlink control information including carrier indicator field information; and
      transmitting the downlink control channel signal to a user terminal; and
   at the user terminal:
      receiving the downlink control channel signal; and
      executing signal processing with respect to a downlink signal in accordance with the downlink control information,
   wherein the carrier indicator field information is information that associates a carrier index and a number of subframes to schedule victim subframes, and wherein a transmitter of the radio base station transmits using time division duplexing, and a processor of the radio base station achieves broadbandization by carrier aggregation.

11. The radio communication method according to claim 10, wherein, when a configuration in which there are fewer downlink subframes in a configuration of a primary cell than downlink subframes in a configuration of a secondary cell is used, victim subframes in the secondary cell are scheduled by a super subframe in the primary cell.

12. The radio communication method according to claim 11, wherein a separate HARQ process is applied to scheduling information of each victim subframe by the user terminal.

13. The radio communication method according to claim 10, wherein a separate HARQ process is applied to scheduling information of each victim subframe by the user terminal.

* * * * *